(12) United States Patent
Biel et al.

(10) Patent No.: US 12,510,651 B2
(45) Date of Patent: Dec. 30, 2025

(54) LOCATING VEHICLES BY MEANS OF RADAR REFLECTORS

(71) Applicant: ZF Friedrichshafen AG, Friedrichshafen (DE)

(72) Inventors: Steffen Biel, Friedrichshafen (DE); Stefan Traub, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 147 days.

(21) Appl. No.: 18/246,761

(22) PCT Filed: Sep. 8, 2021

(86) PCT No.: PCT/EP2021/074702
§ 371 (c)(1),
(2) Date: Mar. 27, 2023

(87) PCT Pub. No.: WO2022/069172
PCT Pub. Date: Apr. 7, 2022

(65) Prior Publication Data
US 2024/0012131 A1    Jan. 11, 2024

(30) Foreign Application Priority Data

Sep. 29, 2020   (DE) .................... 10 2020 212 232.6

(51) Int. Cl.
*G01S 13/75*   (2006.01)
*G01S 13/931*   (2020.01)

(52) U.S. Cl.
CPC ............ *G01S 13/75* (2013.01); *G01S 13/931* (2013.01); *G01S 2013/9318* (2020.01); *G01S 2013/9329* (2020.01)

(58) Field of Classification Search
CPC ................... G01S 13/75; G01S 13/931; G01S 2013/9329; G01S 2013/9318
See application file for complete search history.

(56) References Cited

U.S. PATENT DOCUMENTS

| 4,249,176 A | 2/1981 | Oishi et al. |
| 6,120,154 A | 9/2000 | Ishizaka |
| 7,218,385 B2 | 5/2007 | Takagi |
| (Continued) | | |

FOREIGN PATENT DOCUMENTS

| DE | 10 2016 216 251 A1 | 3/2018 |
| DE | 10 2017 209 591 A1 | 12/2018 |
| DE | 10 2017 220 004 A1 | 5/2019 |

OTHER PUBLICATIONS

European Patent Office, International Search Report issued in International application No. PCT/EP2021/074702 (Sep. 8, 2021).

(Continued)

*Primary Examiner* — Vladimir Magloire
*Assistant Examiner* — Nazra Nur Waheed
(74) *Attorney, Agent, or Firm* — Finch & Maloney PLLC

(57) ABSTRACT

The invention relates to an arrangement with a data processing device and a second vehicle (103), which comprises at least one radar sensor (107). The data processing device is designed to recognize at least one radar reflector (105) which is attached to a first vehicle (101), in a signal of the at least one radar sensor (107). The data processing device is designed to locate the at least one radar reflector (105) by means of the signal.

14 Claims, 2 Drawing Sheets

(56) References Cited

U.S. PATENT DOCUMENTS

2006/0103927 A1* 5/2006 Samukawa ........... G01S 17/931
                                                    359/436
2019/0243378 A1* 8/2019 Satyavolu ............ G05D 1/0088

OTHER PUBLICATIONS

European Patent Office, Written Opinion issued in International application No. PCT/EP2021/074702 (Sep. 8, 2021).
German Patent Office, German Search Report issued in German application No. 10 2020 212 232.6 (May 19, 2021).

* cited by examiner

LOCATING VEHICLES BY MEANS OF RADAR REFLECTORS

RELATED APPLICATIONS

This application claims the benefit under 35 U.S.C. § 371 as a U.S. National Phase Application of application no. PCT/EP2021/074702, filed on 8 Sep. 2021, which claims benefit of German Patent Application no. 10 2020 212 232.6 filed 29 Sep. 2020, the contents of which are hereby incorporated herein by reference in their entireties.

FIELD OF THE DISCLOSURE

The invention relates to an arrangement of a data processing device with a vehicle, a method of using a signal of at least one radar sensor, a data processing device adapted to carry out the method, and a computer program product embodying the method.

BACKGROUND

To work on agricultural land, it is often necessary for different agricultural utility vehicles to drive at constant distances alongside one another or behind one another. For example, a tractor with an associated trailer has to drive alongside a harvester in order to collect the material discharged by the latter.

The documents DE 10 2016 251 A1, DE 10 2017 209 591 A1, and DE 10 2005 019 269 B4 disclose road vehicles equipped with radar reflectors. The radar reflectors serve to determine the dimensions and the type of the vehicle.

The document U.S. Pat. No. 6,120,154 A1 also relates to a road vehicle with radar reflectors. A method is disclosed, of determining, from reflections from the radar reflectors of a vehicle driving ahead, its distance from a vehicle driving behind.

Furthermore, radar-based distance regulating cruise controls are known from the prior art. On the basis of radar, these cruise controls determine the distance to a vehicle driving ahead, in order to control the speed of the vehicle following it. For track maintenance purposes the following vehicle orientates itself relative to road-lane markings or other visually recognizable lane boundaries.

SUMMARY

The systems known from the prior art cannot be used in agriculture, however, since there are no lanes on agricultural land.

The purpose of the present invention is to improve the autonomous control of vehicle columns travelling outside of fixed routes. This objective is achieved by an arrangement according of a data processing device with a vehicle, a method of using a signal of at least one radar sensor, a data processing device adapted to carry out the method, and a computer program product embodying the method. Further developments and embodiments will be apparent from the description given below and from the example embodiments illustrated in the figures.

The arrangement according to the invention includes a data processing device and a second vehicle. The data processing device is preferably part of the second vehicle. Alternatively, the data processing device can be located outside the second vehicle and can be connected to the second vehicle, preferably by way of a wireless connection for data transmission.

The second vehicle has at least one radar sensor. That is a sensor designed to receive a radar beam and convert it into a signal.

Preferably, the second vehicle also has a radar sender. That is a means for sending out the radar beam. The radar sensor is preferably designed to receive a radar beam sent out by the radar sender and reflected off an object.

At least one radar reflector is attached to a first vehicle. That is a means for reflecting radar beams. The radar reflector is designed to reflect the radar beam sent out by the radar sender.

Suitable radar reflectors are known from the prior art. Preferably, one or more angle reflectors attached to the first vehicle are used.

The data processing device is designed to recognize the at least one radar reflector attached to the first vehicle, or the reflections from it, in the signal from the at least one radar sensor. Specifically, this means that the data processing device is designed to distinguish parts of the signal coming from reflections off the at least one radar reflector from other parts of the signal. Suitable methods for this are known from the prior art.

According to the invention, the data processing device is designed to determine the position of the at least one radar reflector by means of the signal. This means that the data processing device uses the signal from the at least one radar reflector to determine the location of the at least one radar reflector. As the reference system, a location reference system or one that is fixed relative to the vehicle is used. The location can be defined in the reference system by determining three position coordinates. If the sub-surface over which the vehicle is travelling is flat, one of the three coordinates is already established by the said sub-surface. In that case the invention is limited to determining the other two position coordinates.

The invention is suitable for position-determination outside of fixed routes. Accordingly, the first and the second vehicles can be agricultural machines or building machines.

In a preferred further development, at least two radar reflectors are attached to the first vehicle. The data processing device is correspondingly also further developed to locate the at least two radar reflectors by means of the signal. Having at least two radar reflectors is advantageous since this enables their separation to be evaluated, which simplifies the location process.

In another preferred further development, the data processing device is designed to fix the position of the first vehicle. The location of the first vehicle, that is to say the determination of its position or position co-ordinates, stems directly from the location of the radar reflectors.

Besides the location, in a preferred further development, the position of the at least one radar reflector is determined at least partially by the data processing device by means of the signal from the at least one radar sensor. The position of the at least one radar reflector refers to its angular position or orientation in space. The position is preferably determined in the same reference system in which the at least one radar reflector is also located.

The position of the at least one radar reflector is defined by three angles. Two of the angles are determined by the sub-surface over which the first and second vehicles are travelling. If the sub-surface is flat the two angles are constant, so that according to this further development the determination of a single position angle of the at least one radar reflector is sufficient.

Preferably, the data processing device is developed further to determine a position of the first vehicle, at least partially. The position of the first vehicle is defined directly from the position of the at least one radar reflector.

If the second vehicle is to follow the first vehicle, a single location and, if necessary, a determination of the position of the at least one radar reflector is not sufficient. In such a case, according to this further development the at least one radar reflector is located repeatedly by means of the signal from the at least one radar sensor. If necessary, the position of the at least one radar reflector is also determined repeatedly.

A repeated location or determination means a location or determination at a first point in time and a further location or determination at a second point in time. At the first and second points in time in each case the radar beam reflected by the at least one radar reflector is received by the at least one radar sensor and converted into a signal. This is then evaluated by the data processing device for the location and, if necessary, for the position determination.

Furthermore, the location and, if necessary, the position determination preferably take place continuously, i.e. in a continuous sequence.

In a preferred further development, the repeated location and, if necessary, position determination enable the data processing device to determine a trajectory of the at least one radar reflector. A trajectory is a path in space along which an object moves.

From the trajectory of the at least one radar reflector a trajectory of the first vehicle is obtained directly. In a preferred further development, this is determined by the data processing device.

By means of the trajectory of the at least one radar reflector or that of the first vehicle, the second vehicle can be controlled so that it follows the first vehicle at a constant distance. The data processing device is correspondingly developed further so as to steer the second vehicle along the trajectory of the at least one radar reflector or the first vehicle. This means that the second vehicle is steered by the data processing device in such manner that its trajectory is parallel to the trajectory of the at least one radar reflector or the first vehicle. In particular, the second vehicle can be steered so that the trajectory of the at least one radar reflector or the first vehicle and the trajectory of the second vehicle coincide. The second vehicle then follows the first vehicle exactly.

The method carried out by the data processing device of the arrangement according to the invention described above is a method according to the invention. A data processing device according to the invention is adapted for carrying out the said method. This is for example the case when a computer program is contained on a data carrier of the data processing device. The computer program according to the invention, in turn, is designed to enable the data processing device to carry out the method according to the invention.

BRIEF DESCRIPTION OF THE DRAWINGS

Preferred example embodiments of the invention are illustrated in the figures, in which matching indexes denote the same or functionally equivalent features. Specifically, the figures show.

DETAILED DESCRIPTION

Figure 1:
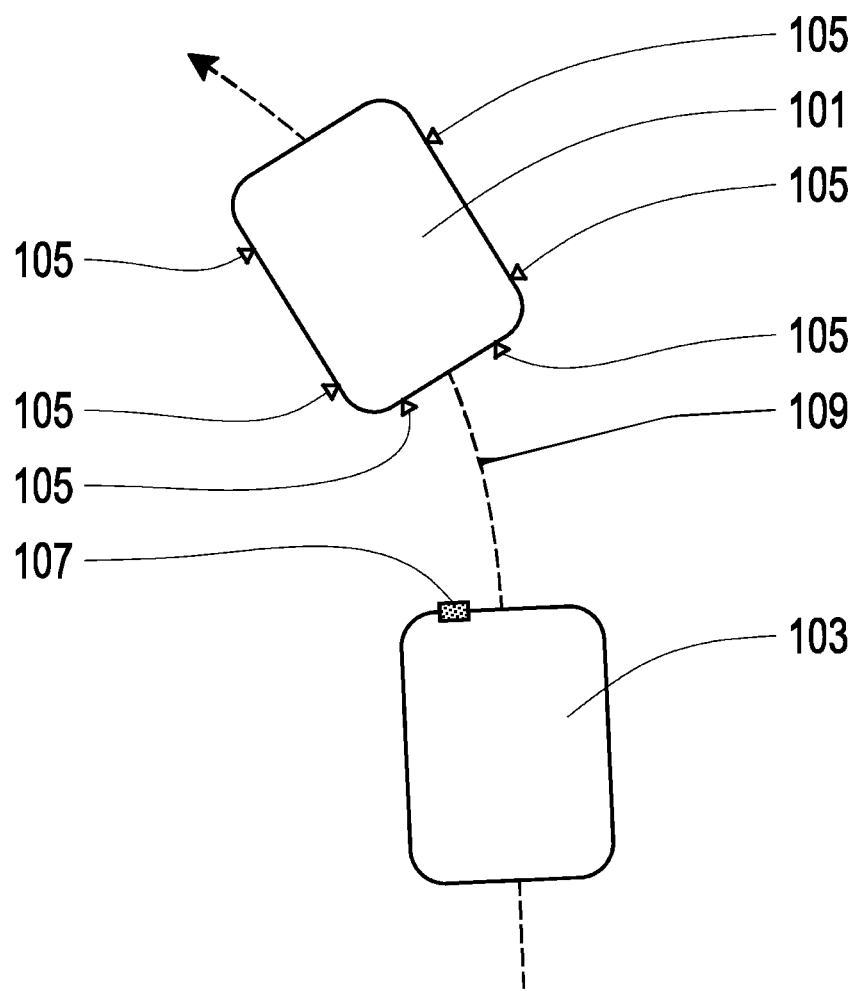
FIG. 1: Two vehicle, one behind the other.

FIG. 1 shows a first vehicle 101 and a second vehicle 103. The first vehicle 101 is fitted with angle reflectors 105. The angle reflectors are arranged in pairs on the sides and on the rear of the first vehicle 101.

The second vehicle 103 has a radar unit 107. This comprises a sender and a receiver. Radar beams sent out by the sender are reflected by the angle reflectors 105 and captured by the receiver. Thereby, the second vehicle 103 can locate the first vehicle 101 exactly and follow it at a constant distance. During this the first vehicle 101 and the second vehicle 103 travel along a matching trajectory 109.

Figure 2:
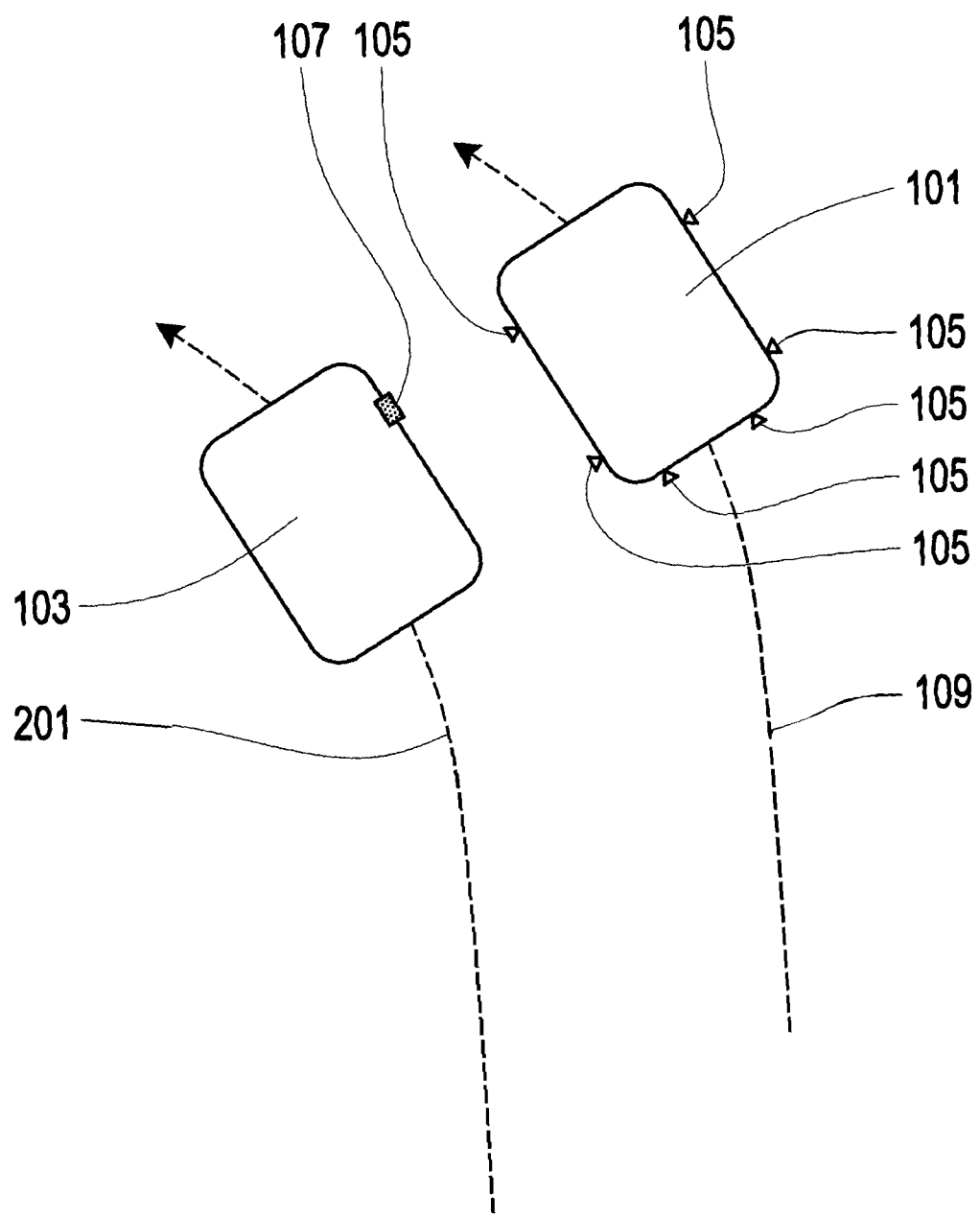
FIG. 2: Two vehicles travelling next to one another.

In FIG. 1 the radar unit 107 is attached on the front of the second vehicle 103. FIG. 2 shows an alternative positioning of the radar unit 107 on the side of the second vehicle 103. This enables the second vehicle 103 to travel along a trajectory 201 parallel to the trajectory 109 of the first vehicle. In this case the second vehicle 103 travels alongside the first vehicle 101 a constant distance away from it.

INDEXES

101 First vehicle
103 Second vehicle
105 Angle reflector
107 Radar unit
109 Trajectory
201 Trajectory

The invention claimed is:

1. A system comprising:
a data processing device;
a first vehicle having radar reflectors arranged in pairs on sides and a rear of the first vehicle; and
a second vehicle having a radar sensor;
wherein the data processing device is configured to recognize at least one of the radar reflectors in a signal of the radar sensor;
wherein the data processing device is configured to locate the at least one of the radar reflectors by means of the signal.

2. The system according to claim 1, wherein the data processing device is configured to locate the first vehicle.

3. The system according to claim 1, wherein the data processing device is configured to at least partially determine a position of the radar reflectors by means of the signal.

4. The system according to claim 3, wherein the data processing device is configured to at least partially determine a position of the first vehicle.

5. The system according to claim 1, wherein the data processing device is configured to locate the radar reflectors repeatedly and/or to repeatedly determine a position thereof.

6. The system according to claim 5, wherein the data processing device is configured to determine a trajectory of the radar reflectors.

7. The system according to claim 6, wherein the data processing device is configured to determine a trajectory of the first vehicle.

8. The system according to claim 7, wherein the data processing device is designed to steer the second vehicle along a path that runs parallel to the trajectory of the first vehicle.

9. A method of using the system of claim 1 and the signal of at least one of the radar sensors attached to the sides of the second vehicle, the method comprising:
recognizing in the signal at least one of the radar reflectors arranged in pairs on the sides and the rear of the first vehicle;
locating the at least one of the radar reflectors by means of the signal;
determining a trajectory of the first vehicle by means of the at least one of the radar reflectors recognized in the signal;

steering the second vehicle along a path that is parallel to the trajectory of the first vehicle.

10. A non-transitory computer program product containing executable code that when executed by the system of claim 1, performs the following method:
   recognizing in the signal at least one of the radar reflectors arranged in pairs on the sides and the rear of the first vehicle;
   locating the at least one of the radar reflectors by means of the signal;
   determining a trajectory of the first vehicle by means of the at least one of the radar reflectors recognized in the signal; and
   steering the second vehicle along a path that is parallel to the trajectory of the first vehicle.

11. A method of using the system of claim 1, the method comprising:
   providing the system of claim 1;
   recognizing in the signal at least one reflector of the radar reflectors arranged in pairs on the sides and the rear of the first vehicle;
   locating the at least one reflector by means of the signal;
   determining a trajectory of the first vehicle by means of the at least one reflector recognized in the signal; and
   steering the second vehicle along a path that is parallel to the trajectory of the first vehicle.

12. The method according to claim 11, comprising determining, on a repeated basis, a position of the first vehicle.

13. The method according to claim 11, wherein locating the at least one reflector is performed repeatedly.

14. The method according to claim 11, wherein both the first vehicle and the second vehicle are moving.

* * * * *